United States Patent [19]

Thompson

[11] 4,349,885
[45] Sep. 14, 1982

[54] SET PRESSURE MEASURING SYSTEM

[75] Inventor: Leonard J. Thompson, Wrentham, Mass.

[73] Assignee: Crosby Valve & Gage Company, Wrentham, Mass.

[21] Appl. No.: 215,549

[22] Filed: Dec. 11, 1980

Related U.S. Application Data

[63] Continuation of Ser. No. 22,197, Mar. 20, 1979, abandoned.

[51] Int. Cl.³ ............................................. F16K 31/00
[52] U.S. Cl. .................................. 364/558; 137/487.5
[58] Field of Search ................ 364/558; 137/455, 458, 137/461, 469, 487.5

[56] References Cited

U.S. PATENT DOCUMENTS

| | | | |
|---|---|---|---|
| 1,637,743 | 8/1927 | Fine | 73/4 R |
| 2,419,293 | 4/1947 | Simonson | 73/4 |
| 3,269,170 | 8/1966 | Sebring et al. | 73/4 |
| 3,641,877 | 2/1972 | Herbert | 91/461 X |
| 3,776,249 | 12/1973 | Wailes et al. | 137/487.5 X |
| 3,878,376 | 4/1975 | Sholes, Jr. et al. | 364/558 X |
| 3,972,327 | 8/1976 | Ernst et al. | 137/487.5 X |
| 4,133,511 | 1/1979 | Hartmann et al. | 137/487.5 X |

Primary Examiner—Edward J. Wise
Attorney, Agent, or Firm—Kenway & Jenney

[57] ABSTRACT

A device for measuring the set pressure of a safety valve coupled to a pressure line, where the valve includes a springloaded closure element which is normally biased to close a port of the pressure line. The device includes a position transducer which generates a signal representative of the closure element position with respect to the port. In addition, a forcer is selectively operable to apply a force ramp to the closure element in the direction opposite to the springloaded bias. A force transducer generates a signal representative of the force applied to the closure element. A measurement cycle controller controls the measurement operation initially to activate the forcer. During the application of the force ramp to the closure element, a test time is identified. This test time occurs to mark when the closure element has moved a predetermined distance from its port position. At that test time, the controller detects the current pressure within the pressure line and the force currently applied to the closure element by the forcer, and then uses those detected values to generate a signal representative of the set pressure of the valve.

6 Claims, 2 Drawing Figures

SET PRESSURE MEASURING SYSTEM

This is a continuation of application Ser. No. 22,197, filed Mar. 20, 1979, abandoned.

BACKGROUND OF THE DISCLOSURE

The present invention relates to pressure line instrumentation, and more particularly to safety valve set pressure measuring devices.

In the prior art, pressure lines are often designed with safety valves located at various positions along their length. The conventional valves, such as the Type HB Valves, manufactured by Crosby Valve and Gage Company, Wrentham, Mass., include a closure element which is nominally biased against the port to seal the port. Typically, this bias is provided by a springloaded assembly coupled to the closure element. The safety valve is designed so that when the pressure in the line is below a predetermined threshold, defined as the set pressure, the valve port is sealed. However, when the pressure within the line exceeds the set pressure, the line pressure is sufficient to overcome the spring bias so that the valve lifts from its seating in the valve port and the medium within the pressure line may freely escape. In the prior art, safety valves are designed for specifically desired set pressures for various applications.

One problem in the use of such safety valves is the need to ensure that the set pressure for a valve, as installed, does not change with time, or, if the set point does change, this change may be measured. In general, the set points for safety valves are periodically tested. In one approach to measuring set points, the valve is removed from the pressure line assembly, fitted to a test jig, tested for set point, and then reinstalled or replaced as necessary. This approach, of course, necessitates a shutdown of the pressure line during set point testing.

In an alternative approach known in the art, a valve may be fitted with an air-operated lifting motor (in the form of a diaphram sealed, air cylinder having a known effective area) coupled to the closure element, and a pressure gauge. In operation, a test operator applies air pressure to the air motor by way of an air pressure regulator or a manual control valve. The resultant force from the motor is applied to the closure element to lift the closure element against the springloaded bias. When the lifting force from the motor together with the force from the pressure within the line is sufficient to overcome the springloaded bias force, the closure element lifts off its seat, accompanied by an audible leak (or "pop"). When the "pop" is detected by the operator, the air pressure applied to the air motor is measured, and a differential force value may be derived from a predetermined relationship between those parameters for the valve. This differential pressure may be added to the pressure within the line to yield the set pressure characteristic for the valve.

While the audible "pop" which accompanies the lift of the closure element does provide a point at which a reliable set pressure measurement may be determined, this approach is not an acceptable test procedure in many applications. For example, there may be a relatively noisy environment where the test operator may not be able to detect the "audible pop." Furthermore, in some applications, such as in boiling water reactor plants, there are hazardous radiation environments in which the set point test operator may not safely enter the immediate region of the valve-to-be-tested. In the prior art, there have been attempts to utilize the above described "audible pop" technique with an acoustical transducer so that remote set point testing may be performed for valves in operational systems. However, these attempts have been unsuccessful, principally due to background noise.

It is an object of the present invention to provide a remote set pressure measurement device.

A further object is to provide a set pressure measurement device which may monitor set pressure characteristics of valves in hostile operational environments.

It is yet another object to provide a plurality of set pressure measurement devices coupled to safety valves at remote location which may be operated periodically under the control at a central controller.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
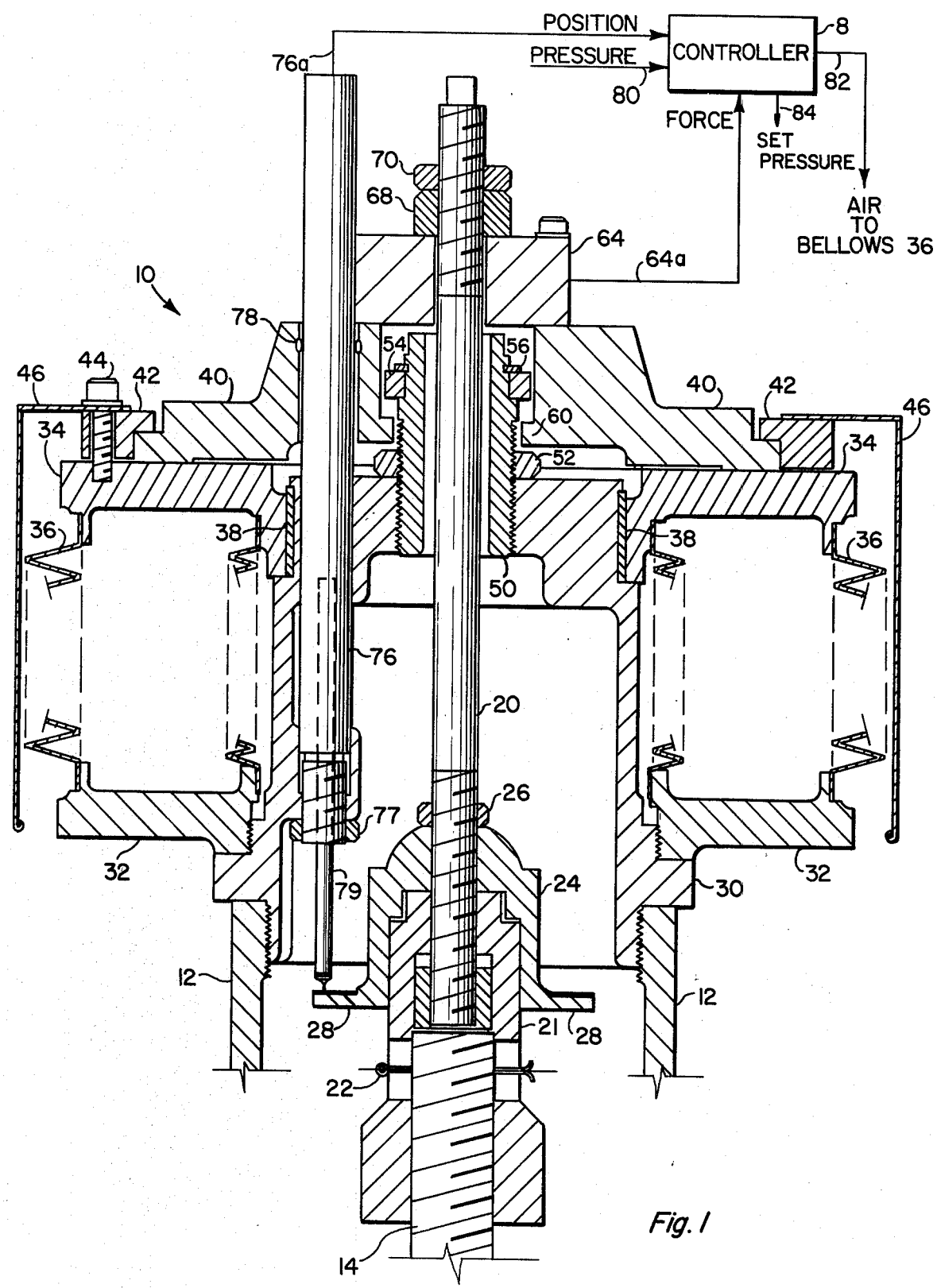
FIG. 1 shows an embodiment of the present invention.

FIG. 1 shows an embodiment of the present invention. As shown, this embodiment includes a controller 8 and a test assembly 10 screw-fit to the top, or bonnet, of a conventional safety valve which may be coupled at a part of a pressure line. By way of example, the safety valve may be as type HB valve, manufactured by Crosby Valve and Gage Company, Wrentham, Mass. This valve assembly includes a top, or bonnet, having a threaded portion denoted by reference designation 12 in FIG. 1. In addition, the closure element for the valve includes a spindle extending from the closure element, the top of which is denoted by reference designation 14 in FIG. 1. This valve is merely exemplary and other forms of conventional valves may readily be adapted for use with the present embodiment 10.

The test asembly 10 includes a spindle extension 20 which is coupled to the spindle 14 by way of a spindle nut 21 and cotter pin 22. A gage head actuator 24 is affixed to the spindle extension 20 by a lock nut 26. The actuator 24 includes a substantially horizontal (as illustrated) flange 28 to be described in more detail below.

The test assembly 10 also includes a main support member 30 which is screw fitted to the threaded portion 12 of the bonnet of the associated valve. The support member 30 supports an annular bellows assembly having a fixed lower base member 32, a movable upper base member 34, and a collapsible bellows 36 positioned between base members 32 and 34. The bellows assembly also includes an input coupling (not shown) for the passage of air to and from the interior of the bellows 36. A wear-strip 38 is affixed to support member 30 to minimize friction between upper base member 34 as it moves with respect to support member 30. As shown, the upper base member 34 is in its lowermost position. As the air pressure increases in the interior of bellows 36, the upper base member 34 is driven upwardly along the wear-strip 38.

A load plate 40 is adjacent to the base member 34. A retaining ring 42 and associated cap screws (including screw 44) are used to couple the load plate 40 to the base member 34 of the bellows assembly. As a result, the load plate 40 is coupled to the movable plate 34 of the bellows assembly, so that as the load plate moves vertically (as illustrated) along the spindle extension 20, the load plate 40 moves with it. An outer housing member 46 is also supported by the cap screw 44, and the other cap screws, to the movable base member 34 of the bellows assembly. The outer housing 46 serves as a protective member to the bellows assembly.

A lift stop member 50 is screwed into the top of the main support member 30, and held in place by a lift stop lock nut 52. Lift stop 50 includes a collar 54 held in place by a retaining ring 56. In this configuration, the lift stop member 50 is affixed to the support member 30 which is affixed to the top portion 12 of the valve. As the movable base member 34 of the bellows assembly moves up and down (as illustrated), the load plate 40 moves up and down but is limited in the upward direction by the interfering engagement of the collar 54 with the flange 60 of the load plate 40.

At its upper end, the load plate 40 is coupled to a load cell, or force transducer, 64. By way of example, the load cell 64 may be a BLH type 44098-2 cell. The load cell 64 is limited from moving with respect to the spindle extension 20 by take-up nut 68 and jam nut 70. With this configuration, as the bellows 36 expands, the load plate 40 is displaced upwardly and compresses the load cell 64. The load cell 64 provides an output signal on line 64a representative of stress within the cell. Since the load cell 64 is coupled directly to the spindle extension 20, the output signal on line 64a corresponds to the force applied by the bellows assembly to the closure element (by way of spindle extension 20 and valve spindle 14).

The embodiment of FIG. 1 also includes LVDT position transducer 76, which is affixed by lock nut 77 to the support member 30. In the present embodiment, the LVDT transducer 76 is a Trans-Tek type 354-000 gage head. An O-ring 78 provides anti-vibration restraint for transducer 76. In addition O-ring 78 permits relatively friction-free motion of the load plate 40 with respect to the casing of transducer 76. The gage head includes a core member 79, which is adapted to be driven by the flange 28 of the actuator 24 as the spindle 14 is raised or lowered (either by the bellows assembly or by pressure within the pressure line). The core 79 provides a variable predetermined coupling between the input and output coils of the transformer of the transducer 76, depending on the position of the closure element of the valve. The transducer 76 provides an output signal on line 76a which is representative of the position of the core 79 (which in turn is representative of the position of the valve closure element between a first limit position closing the valve port and a second limit position opening the valve port).

Controller 8 is coupled to line 76a (providing a closure element position signal), line 64a (providing a forcer signal) and line 80 (providing a signal representative of the pressure within the pressure line). Controller 8 also provides a control signal on line 82 for controlling air flow to bellows 36 in a conventional manner, and an output signal on line 84 representative of the set pressure for the valve.

In operation, at the initiation of a measurement cycle, the controller 8 controls the air pressure within the bellows assembly 36 to increase so that the bellows expand. In response to the bellows expansion, the movable plate 34 is raised upward and, in turn, moves the load plate 40. The motion of the plate 40 is transmitted directly by the force transducer 64 and the nut 68 and 70 to the valve spindle extension 20, and then by way of the spindle 14 to the closure element. With the gradual increase of air pressure, the bellows provides a force ramp to the closure element. In the preferred form of the invention, the force ramp is linear with the force increasing uniformly with time. Other embodiments may use non-linear form ramps.

In response to the force applied by way of the bellows, the closure element is raised from the position where the valve seals the associated port in the pressure line, and the core 79 of the transducer 76 is pushed upward by the flange 28. As a result, the transducer 76 provides an output signal representative of the position of the valve closure element between a first limit position (where the closure element seals the port) and a second limit position (where the valve is full open).

The controller 8 monitors the signal on line 76a from the position transducer 76 and detects the "test time," i.e. the time when the core has been displaced by a predetermined distance (corresponding to the lift of the closure element of the valve assembly from the sealing position). At the time that this distance is reached by the core member 78, the controller 8 then obtains (via line 64a from the load cell) a signal representative of force applied to the force transducer 64. In addition, controller 8 obtains a signal representative of the pressure within the pressure line from line 80. The controller 8 then utilizes these signals to generate a set pressure signal $T_p$, which corresponds to the pressure within the line, $S_p$, plus the ratio $F/A_s$, where $A_s$ is the effective area of the closure element, and F is the force applied to the closure element at the test time. The controller in the present environment may be readily provided by conventional circuitry, such as by a microprocessor controller.

In alternative forms of the present invention, the controller 8 may be adapted to initially monitor (via line 64a) the force applied to the closure element (rather than the displacement). When the detected force reaches a predetermined threshold, the controller 8 checks (via line 76a) position transducer to determine if the closure element has lifted from its seat. If so, the set pressure value is determined as described above. If the closure element has not yet lifted, then controller 8 directs an increase in force to the closure element and the cycle repeats until lift occurs and a set point value is determined.

In system configurations, a plurality of set pressure measurement devices similar to the one illustrated in FIG. 1 can be utilized at various points along one or more pressure lines. The controller may be readily adapted using conventional techniques to sequentially activate a measurement cycle at each of the set pressure measuring devices, and record the set pressure for the respective valves. Alternatively, the controller may go one step further and compare the determined set pressure values with desired set pressure values for particular valves at the various locations and provide error signals at times when the set pressure for the valve tested is more than a predetermined tolerance value away from the desired value.

Figure 2:
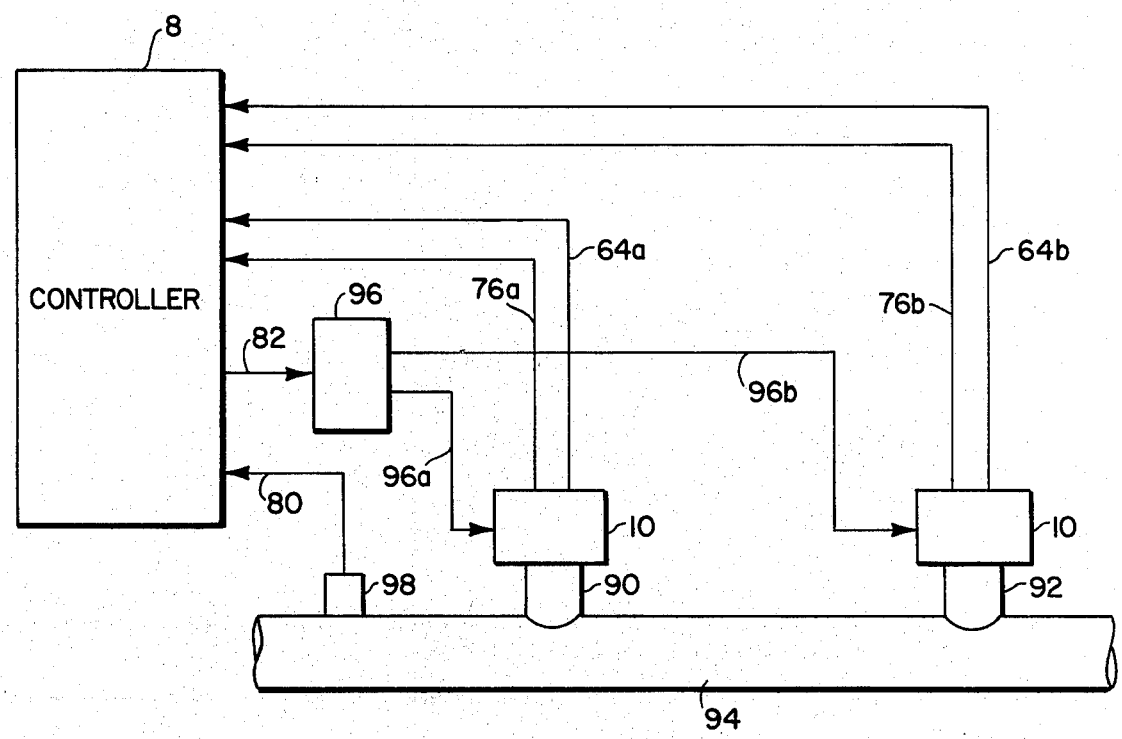
FIG. 2 shows an exemplary configuration having two remote set pressure monitoring devices and a central controller in accordance with the present invention.

FIG. 2 illustrates an exemplary system wherein test assemblies similar to that shown in FIG. 1 are connected to valves 90 and 92 along a pressure line 94. In FIG. 2, elements substantially similar to those in FIG. 1 are identified with the same reference designations. Each of the valves 90 and 92 includes a test assembly 10 coupled thereto. An air flow regulator 96 is driven by signals from line 82 of controller 8 to provide air flow on line 96a and 96b for the respective bellows assemblies. FIG. 2 also shows a pressure transducer 98 which detects the pressure within line 94 and generates a corresponding signal on line 80. In this configuration, separate force and position signal lines are used to couple the transducers with controller 8. It will be understood that conventional data communication systems may be readily adapted to provide this signal communication link between the controller 8 and the various test assemblies, for example, by conventional time division multiplex techniques.

In operation, the central controller 8 may be programmed for a periodic monitoring of the set pressures for the valves on pressure line 94. For example, the valve 90 may be tested at a first time by driving regulator 96 so that a force ramp is applied to the closure element by way of the bellows assembly and load plates associated with the set pressure measuring device coupled to valve 90. By monitoring the position signal of the actuator by way of line 76a, the controller 8 can detect the test time for that assembly and then detect the value of applied force at that test time provided by transducer 64 by way of line 64a, and then compute the set pressure for the valve 90 using signals representative of pressure $S_p$ within the line 94 and the effective area $A_s$ of the valve closure element. The controller may then compare this measured set pressure value with a reference set pressure value, and either accept the measured value as being within tolerance, or signal a warning condition for a value out of tolerance. The controller may then go on to test the set pressure of the safety valve 92. In the present embodiment, it is assumed that the pressure within line 94 is provided by sensor 98 for the various valves in the system. In some configurations, pressure sensors must be utilized at the various remote locations in order to get an accurate pressure value for the valves to be tested at those locations.

In alternative system configurations, for each valve, the "test time" determination may be made based to detection of a threshold force applied to the closure element, rather than detection of a predetermined displacement of the closure element.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Apparatus for monitoring the set pressure of the valve coupled to a port in a pressure line having an internal pressure $S_p$, said port having an effective area $A_s$, wherein said valve includes a closure element movable between a first limit position sealing said port and a second limit position opening said port, and includes a springloaded means for biasing said closure element towards said first limit position, comprising:

A. position transducer for generating a position signal representative of the position of said closure element between said first and second limit positions,
B. forcer means selectively operable to apply a force ramp to said closure element in the direction opposite to said bias provided by said springloaded means,
C. force transducer for generating a force signal representative of the force applied to the said closure element by said forcer means,
D. controller means selectively operable to control a set point measurement cycle, including:
means for activating said forcer means,
means for monitoring said position transducer and said force transducer, and for detecting a test time when said position signal is representative of a predetermined displacement of said closure element from said first limit position, and, in response to said detection, for disabling said forcer means and computing a signal $T_p$ representative of the set pressure of said valve in accordance with $$T_p = S_p + F/A_s$$

where F is representative of the force signal at said test time, $S_p$ is representative of said internal pressure, and $A_s$ is representative of the effective area of said port.

2. Apparatus for measuring the set pressure of a valve coupled to the port of a pressure line, said valve having a closure element and a spring loaded means for biasing said closure element to a sealing position against said port, whereby said closure element is positioned to seal said port when the pressure within said line is less than said set pressure and said port is open otherwise, comprising:
means for performing a set point measurement cycle including
A. forcer means for applying a force ramp to said closure element in the direction opposite to said bias from said springloaded means,
B. means for detecting a test time when said closure element has moved a predetermined distance from said port in response to said force ramp,
C. means for generating a pressure signal $S_p$ representative of the pressure within said line at said test time,
D. means for generating a force signal F representative of the force applied to said closure element by said forcer means at said test time,
E. means for generating a signal representative of the set pressure characteristic of said valve, said set pressure corresponding to the sum of the pressure in said line and the ratio $F/A_s$, where $A_s$ is representative of the effective area of said port.

3. A system for monitoring the set pressure of a plurality of remote valves, each valve being coupled to an associated port in a pressure line, wherein each of said valves includes a closure element movable between a first limit position sealing its associated port and a second limit position opening its associated port, and includes a springloaded means for biasing said closure element towards said first limit position, comprising:
A. a set pressure test means associated with and coupled to each of said remote valves, each of said test means including:
position transducer for generating a position signal representative of the position of the closure element of said associated valve between said first and second limit positions, forcer means selectively operable to apply a force ramp to the closure element of said associated valve in the direction opposite to said bias provided by the springloaded means of said associated valve force transducer for generating a force signal representative of the force applied to the closure element of said associated valve by said forcer means, and B. a central controller and associated means for interconnecting said controller and said remote valves, said controller being selectively operable to control a set point measurement cycle for each of said remote valves, said controller including:

means for activating said forcer means associated with said remote valves, means for monitoring said position transducers and said force transducers associated with said remote valves, and for detecting test times for each respective valve when the position signal associated with said responsive valve is representative of a predetermined displacement of the closure element of the associated valve from said first limit position, and, in response to said detection, for disabling said forcer means for said respective valve and computing a signal $T_p$ repesentative of the set pressure of said respective valve in accordance with $$T_p = S_p + F/A_s$$

where F is representative of the force signal at said test time for said respective valve, $S_p$ is representative of the pressure in said pressure line at said respective valve, and $A_s$ is representative of the effective area of said port of said respective valve.

4. Set pressure test apparatus for a valve coupled to a port in a pressure line having an internal pressure $S_p$, said port having an effective area $A_s$, wherein said valve includes a closure element movable between a first limit position sealing said port and a second limit position opening said port, and includes a spring loaded means for biasing said closure element towards said first limit position, comprising:

A. position transducer for generating a position signal representative of the position of said closure element between said first and second limit positions, B. forcer means selectively operable to apply a force ramp to said closure element in the direction opposite to said bias provided by said spring loaded means, and C. force transducer for generating a force signal representative of the force applied to said closure element by said forcer means.

5. The apparatus according to claim 4 wherein said position transducer includes an associated extension member and gage actuator flange member, coupled to and extending from said closure element and adapted to drive said position transducer in response to motion of said closure element between said first and second limit positions, wherein said forcer means includes a bellows assembly having a first end fixed with respect to said port and a second end coupled to said closure element, and means for selectively moving said second end with respect to said first end to drive said closure element between said first and second limit positions, and wherein said force transducer is coupled between said second end of said bellows assembly and said extension member.

6. The apparatus according to claim 1 wherein said position transducer includes an associated extension member and gage actuator flange member, coupled to and extending from said closure element and adapted to drive said position transducer in response to motion of said closure element between said first and second limit positions, wherein said forcer means includes a bellows assembly having a first end fixed with respect to said port and a second end coupled to said closure element, and means for selectively moving said second end with respect to said first end to drive said closure element between said first and second limit positions, and wherein said force transducer is coupled between said second end of said bellows assembly and said extension member, wherein said controller means includes means for selectively actuating and disabling said moving means.

* * * * *